(12) United States Patent
Thurner et al.

(10) Patent No.: US 7,165,226 B2
(45) Date of Patent: Jan. 16, 2007

(54) MULTIPLE COUPLED BROWSERS FOR AN INDUSTRIAL WORKBENCH

(75) Inventors: Elmar Thurner, Nürnberg (DE); Stefan Doblmayr, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 838 days.

(21) Appl. No.: 10/226,981

(22) Filed: Aug. 23, 2002

(65) Prior Publication Data

US 2004/0036698 A1 Feb. 26, 2004

(51) Int. Cl.
*G06F 3/00* (2006.01)
*G06F 9/00* (2006.01)
*G06F 17/00* (2006.01)
*G05B 15/00* (2006.01)
*G05B 19/42* (2006.01)

(52) U.S. Cl. .............. 715/767; 715/737; 715/771; 715/802; 715/804; 700/83; 700/87

(58) Field of Classification Search ........ 715/734–738, 715/764, 767, 771, 783, 802, 804, 805, 810, 715/835, 965, 853–855, 969, 970; 700/17, 700/83, 86, 87
See application file for complete search history.

(56) References Cited

U.S. PATENT DOCUMENTS

| | | | | |
|---|---|---|---|---|
| 5,072,412 A | * | 12/1991 | Henderson et al. | 715/804 |
| 5,247,433 A | * | 9/1993 | Kitaura et al. | 700/83 |
| 6,189,019 B1 | * | 2/2001 | Blumer et al. | 715/513 |
| 6,587,108 B1 | * | 7/2003 | Guerlain et al. | 345/440 |
| 6,795,798 B1 | * | 9/2004 | Eryurek et al. | 702/188 |
| 6,888,554 B1 | * | 5/2005 | Decombe | 345/645 |
| 6,889,096 B1 | * | 5/2005 | Spriggs et al. | 700/17 |
| 6,947,798 B1 | * | 9/2005 | Bronikowski et al. | 700/90 |
| 6,966,033 B1 | * | 11/2005 | Gasser et al. | 715/738 |
| 2005/0004781 A1 | * | 1/2005 | Price et al. | 702/188 |

* cited by examiner

*Primary Examiner*—Crystal J. Barnes
(74) *Attorney, Agent, or Firm*—Baker Botts L.L.P.

(57) ABSTRACT

Multiple Views of an Industrial Plant are graphically displayed and viewed. A graphical user interface displays the views in corresponding panes or windows of the graphical user interface. The views, being graphical representations of systems of the Industrial Plant, are coupled by a coupler according to a predetermined relationship between the underlying systems of the Industrial Plant represented by the coupled views. The coupler automatically refocuses the panes to display different views of the Industrial Plant based on a selection of an object in any of the panes or on a manual refocus of one view and on the predetermined relationship for coupling the views. The Coupled views represent different domains of the Industrial Plant or Industrial Network e.g. real-time monitoring and operation, configuration, debugging, maintenance, scheduling, asset management, documentation, training, simulation, physical construction, material flow monitoring, programming, interconnecting function blocks, performance analysis. The analysis may be provided at different points in time (now, past, predicted future) and with a different spatial focus (parts, whole). Coupling different views greatly reduces handling effort for building and operating Industrial Plants.

25 Claims, 6 Drawing Sheets

Fig. 1

PRIOR ART

Fig. 2

PRIOR ART

MULTIPLE COUPLED BROWSERS FOR AN INDUSTRIAL WORKBENCH

BACKGROUND

1. Field of the Invention

The present invention relates to a Workbench for a Manufacturing System or an Industrial Framework and, more particularly, to Multiple Coupled Browsers for the Workbench.

2. Related Information

In the world of Industrial Automation today, manufacturing plants are controlled and monitored by Networks of process controllers and smart devices in the field. These Networks are sophisticated and require intensive IT support. In Automation, Network systems are critical, because failure can spell disaster for a Manufacturer.

Thus, software tools have been developed to assist in the design, configuration, maintenance and control of these Industrial Networks. In the early days, simplistic logic tables were used to implement control code and debugging. As the Industrial Technology grew, however, such arcane methods of monitoring and control proved too cumbersome and clumsy to provide the support necessary for maintaining these evolving systems.

Figure 1:
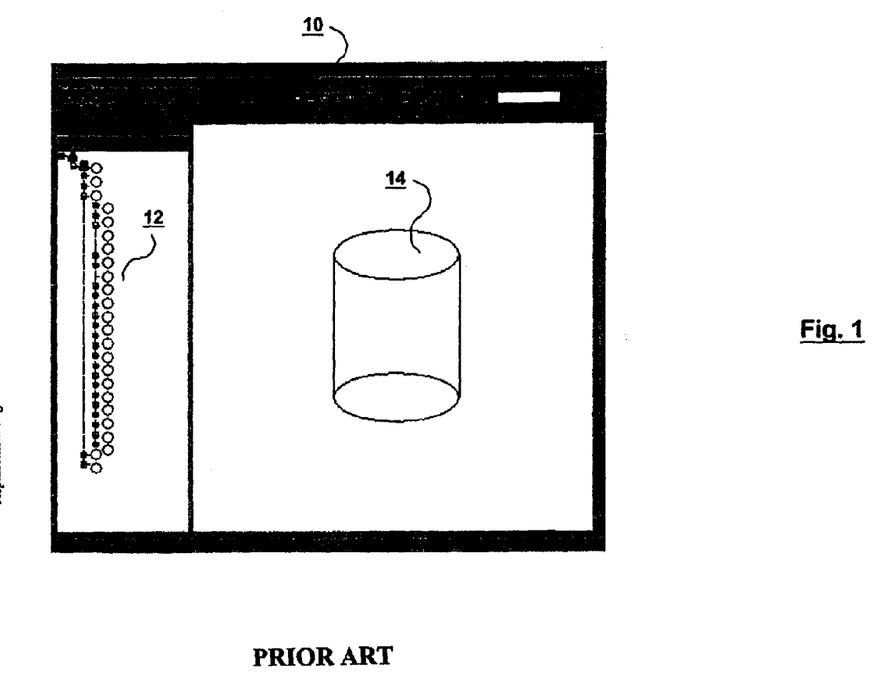
FIG. 1 is a block diagram illustrating the prior art.

More recently, Graphical User Interfaces (GUIs) 10, known as Human Machine Interfaces (HMI), have been specifically developed for monitoring and controlling Industrial Automation systems. While more advanced than the earlier method, these GUIs are user driven. For example, and as shown in FIG. 1, a GUI 10 is provided with a two pane interface. The left pane is a navigation plane that displays a tree of objects 12 relating to an Industrial Network. The right pane is a view plane that displays the object 14 selected by the user. As the user navigates through the tree, i.e., selects various objects in the left plane, the object is displayed in the view plane on the right.

It shall be appreciated that the previous method is completely user driven. The user selects an object for display and the object is displayed. In other words, the old method is not very smart. Nor is the old method user friendly for that matter. In the myriad of systems coupled to an Industrial Network these days, the GUIs of old are far too primitive to adequately assist the Industrial Engineer of today.

What is needed, therefore, is a smart Browser that is capable of assisting the Industrial Engineer of today. Heretofore, there has been no display device which integrates several views of a manufacturing plant in a way that allows the user to navigate through an Industrial Network in a logical and methodical order.

OBJECTS & SUMMARY OF THE INVENTION

It is an object of the present invention to provide a Workbench for an Industrial Network.

It is another object of the present invention to provide a Workbench that couples views of Systems of the Industrial Network in accordance with a predetermined relationship.

It is another object of the present invention to provide a Workbench that couples views of Systems of the Industrial Network in accordance with a Semantic relationship between the views.

It is another object of the present invention to provide Workbench that couples views of Systems of the Industrial Network in accordance with a Temporal relationship between the views.

It is another object of the present invention to provide coupled views of Systems of the Industrial Network in accordance with both a Semantic and a Temporal relationship between the views.

It is another object of the present invention to provide a plurality of groups of coupled views of Systems of the Industrial Network in accordance with a predetermined relationship.

In accordance with the present invention, there is provided a method and device for displaying and coupling views of an Industrial Plant. A graphical user interface displays the views in corresponding panes of the graphical user interface. The views, being graphical representations of systems of the Industrial Plant, are coupled by a coupler according to a predetermined relationship between the underlying systems of the Industrial Plant represented by the coupled views. The coupler automatically refocuses the panes to display different views of the Industrial Plant based on a selection of an object in any of the panes and on the predetermined relationship for coupling the views.

BRIEF DESCRIPTION OF THE DRAWINGS

FIGS. 3a–c is illustrates the present invention.

The several drawings shall be described in more detail, wherein like reference numerals refer to same or similar elements.

DETAILED DESCRIPTION OF THE PREFERRED EMBODIMENTS

The Multiple Coupled Browser Views Workbench of the present invention provides use of a display device which couples several views of a manufacturing plant such that, if the user navigates through one view, all coupled views adjust their focus accordingly.

As already noted, monitoring and controlling such a network is important. In order to facilitate this task, given the complexity of such Industrial Networks, the present invention provides support of integration of Graphical User Interfaces (GUIs) for manufacturing plants and systems like HMI, diagnostic, maintenance, mechanical and electrical engineering.

Figure 2:
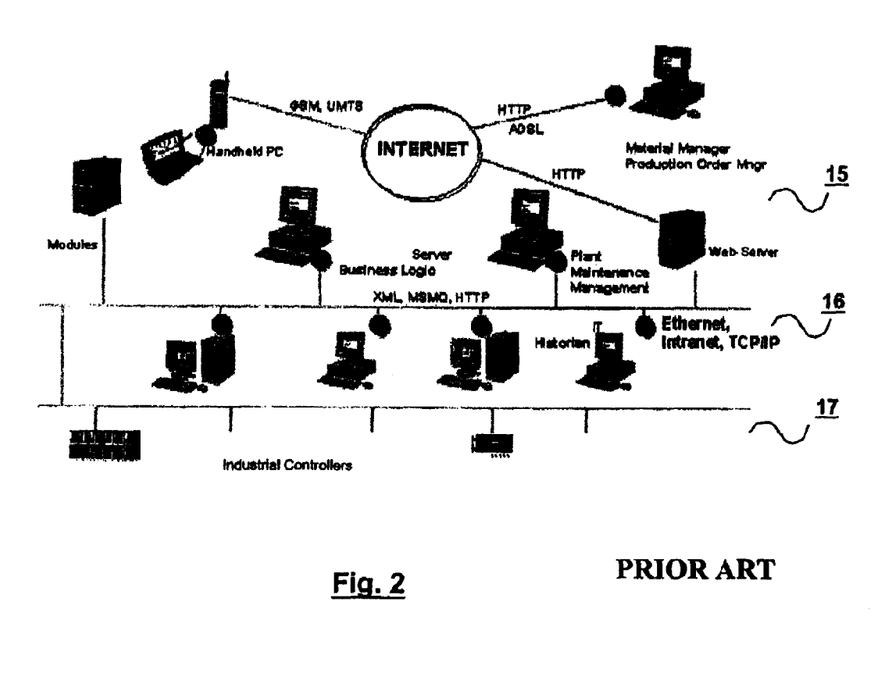
FIG. 2 illustrates a manufacturing system.

FIG. 2 shows the typical network in which the invention is intended to be employed. As shown, there is a server layer 15, a host layer 16 and an application layer 17. Of course, the invention is not only applicable to these kind of networks, but also any type of programming environment.

Figure 3A:
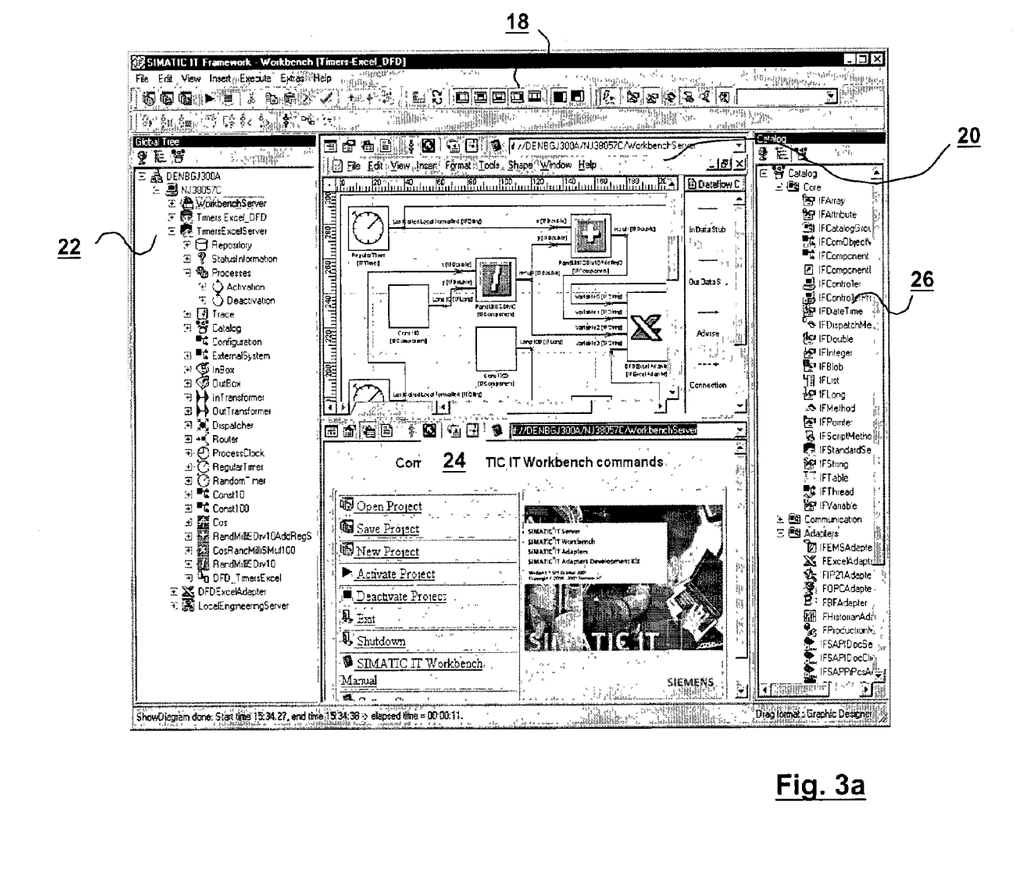
Figure 3B:
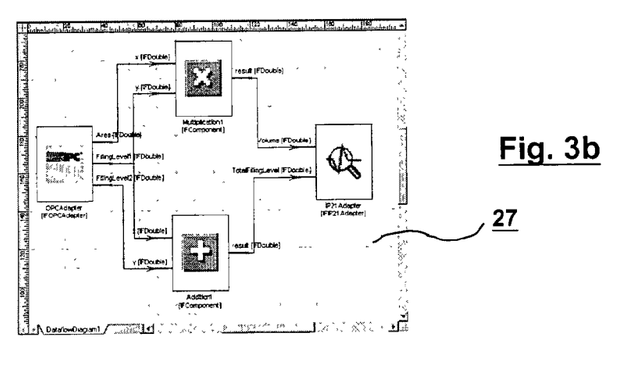
Figure 3C:
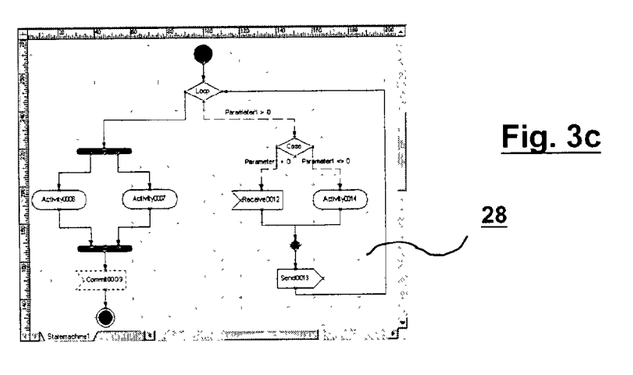

Now turning to the main point of, the present invention, there is provided a Workbench 18 An example is shown in FIGS. 3a–3c, which provides several display area (panes, in the FIG. 4 panes are visible), in which different graphical views of the manufacturing system are displayed. In the example in FIG. 3.a, a tree browser of the system, an editor for distributed workflows and/or data flows, a Web Based HMI GUI and a treeview of the basic objects to construct a system are shown. Other views (not displayed) enable the visualization, design and modification of business objects and business process, runtime GUIs, electrical and mechanical construction of the plant, diagnostic, maintenance, scheduling, information management, PLC-programming, batch design, recipe management, object mappings and project deployments. Views display different domain aspects of the manufacturing plant. All together the Multiple Coupled Browser Views of the present invention truly establishes a universal browser from business level to plant floor.

Providing an overview, or mapping, of the Industrial System, there is provided a Navigation, or Tree Pane 22, displaying an hierarchical tree directory of the system components of the Industrial Network. In the invention, the Tree can be of various types, including a Global Tree, as shown in FIG. 3*a*, which displays the Global System Components of the Industrial Network. There may also be provided a Local Tree within the Tree Pane 22, which displays Local Hierarchies. Further, there may be provided a Catalog Tree in the Tree Pane 22, which graphically displays an Hierarchy of, for example of the areas, units and cells out of which the plant is constructed.

Additionally, in each pane is provided a Tool Bar 24 that enable the selection of the desired view. As with any tool bar, the selected objects can be obtained using a mouse. In most instances, the selection using the present invention is as easy as a single mouse click.

The invention supports Multiple Views, which, as will be appreciated, advantageously provides for simultaneous viewing of alternative portions of an Industrial Network or plant. To that end, the invention provides at least another Tree Pane 26 for displaying, the same or another Tree Hierarchy of objects of a Component or Device of the manufacturing system. With this feature, the user is able to, at once and simultaneously, view and work on different portions of the manufacturing system.

The Workbench provides an Integrated Engineering Environment in which a graphical configuration of distributed workflows and data flows are visually monitored and controlled. This will be demonstrated by in the following example.

As an example, the Workbench provides an integrated engineering environment whereby the integration scenarios are configured. Data structures are mapped from application to application (irrespective of their types or geographical locations) using Dataflow Views 27, as shown in FIG. 3*b*, and communication is synchronized using State Machine Views 28, as shown in FIG. 3*c*.

The Workbench contains a number of tools for building and modifying the Data Structures and Dataflow diagrams. An Object Designer provides graphical design of objects in a number of different views, including Tree, Table, XML, and HTML views. These views are displayed in any pane e.g. left Pane 22. A Data Flow and State Machine Designer graphically displays a data flow and state machine and allows the user to design or modify existing data flows and state machines. The Data Flow and/or State Machine diagrams are displayed in the Workspace 20. A Graphical User Interface, GUI, Designer is provided for designing a GUI. There is also provided Script Editors (for example, VBScript, JScript) which are accessed through the Tools Interface Pane 24. A command window is provided for providing basic commands of the Workbench.

Figure 4A:
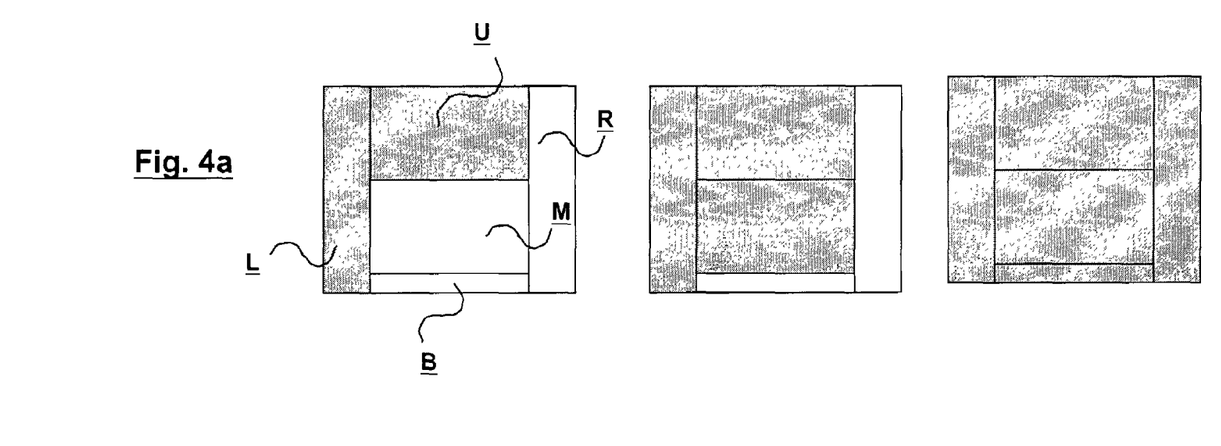
FIGS. 4a–b illustrate Modes of the present invention.

The Multiple Coupled Browser Views Workbench of the present invention provides use of a display device, e.g., Browser or GUI, or the like, to couple several views of a manufacturing plant such that, if the user navigates through one view, all coupled views adjust their focus accordingly. As shown in FIG. 4*a*, there are at least three permutations of how the views can be coupled as provided by the present invention.

In the first arrangement, the left (L) and upper views (U), i.e., panes are coupled, according to a predetermined relationship, such that selection of an object in either pane results in a corresponding refocusing of the other pane on a related object. In the same arrangement, the middle (M), bottom (B) and right (R) panes are coupled, creating a separate view of coupled panes, or views. In the same manner, this view refocuses the coupled panes when an object in a pane is selected. In a second arrangement shown in FIG. 4*a*, it is possible to couple the left (L), upper (U) and middle (M) panes, while separately coupling the bottom (B) and right (R) panes. The panes are coupled according to a predetermined relationship, such that selection of an object in a pane results in a corresponding refocusing of the other pane(s) on a related object. In the third arrangement, all panes are shown coupled. The panes are coupled according to a predetermined relationship, such that selection of an object in a pane results in a corresponding refocusing of the other pane(s) on a related object. The described arrangements support multiple coupling of views, although one coupling a single set, or sub-set, of views is certainly within the scope of the present invention.

Figure 4B:
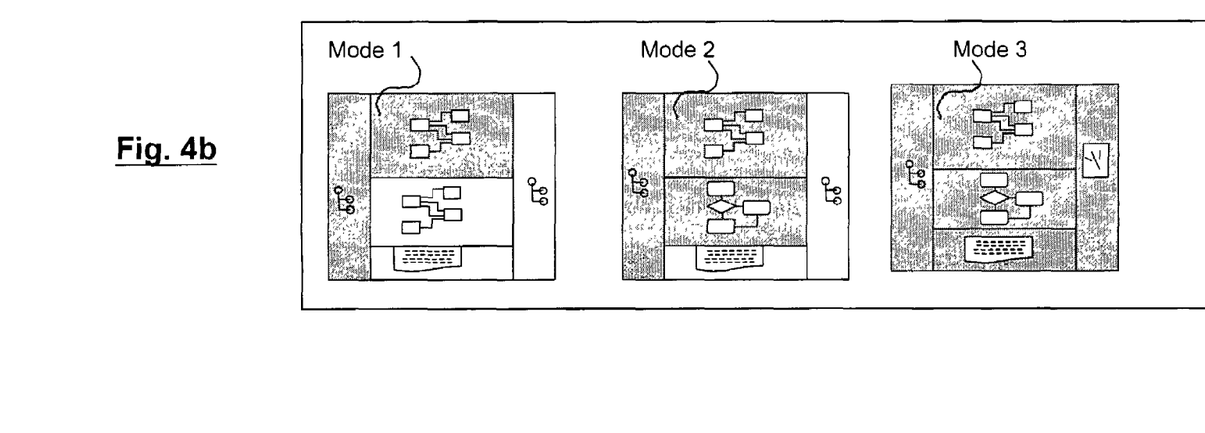

The present invention provides Modes of Operation of the workbench. An example with three modes of operation is shown in FIG. 4*b*. In the First Mode two groups of coupled views are visible in one window, in the first group a tree view is coupled with a data flow diagram, in the second group a second tree view with a second data flow diagram and a Documentation view is coupled. This mode enables interconnecting components in two different parts of the system at the same time e.g. two PLC programs. This allows drag and drop of objects without the hassle of navigating in one view, gives better overview and reduces the engineering effort.

In the Second Mode of Operation, a tree view to navigate is coupled with a data flow view to connect function blocks and a business process view to see the effects of the changes in the PLC programming on the business process immediately. In the second group of coupled views a tree view to navigate and a documentation view is coupled.

In the Third Mode of Operation only one group of coupled views exists a tree view to navigate a data flow view to program PLCs, a view of the business process calling the PLC program, a documentation view of the PLC program and an HMI view of the running system This gives optimal overview of one part of the system as it displays this part of the system in four different domain representation simultaneously. Of course, the present invention is not limited to these three specific Modes of Operation, but encompasses method of building Modes of Operation for coupled views of an Industrial Network or manufacturing system. Here, now, are other examples for Modes of Operations as illustrated in FIG. 4*b*.

In the first mode of operation, in more detail, provided by the present invention, the views are coupled Semantically. In the example given, a first coupled Group comprises the left view (L) with, for example, a Plant Hierarchy displayed, and the upper view (U) with, for example, the electrical wiring displayed corresponding to a cell of the Plant selected in the left view (L). In the example shown, there is provided a second coupled Group with a second Plant Hierarchy displayed in the right pane (R), a second electrical wiring diagram corresponding to a selected second cell of the second Plant Hierarchy in the middle pane (M) and, additionally, in the bottom plane (B) there is provided an electronic manual corresponding to second the electrical wiring diagram. In the particular Mode 1 shown, there are two groups which are not coupled.

As mentioned, the First Mode couples the views semantically. This means that the different kinds of views showing different aspects of the same plant simultaneously and the way how a coupled view is refocussed is defined by semantic links between the components which are shown in different views. For example a semantic link can connect a function block (i.e. a part of a PLC program) with the document describing the function block, another semantic link can contain a query of relevant business processes. Semantically coupled views could include the tree view of plant hierarchy, human machine interface of part of plant, physical plant layout, technological process view e.g. the brewing process, diagnostic view and documentation/help view, or any combination thereof.

The advantage of providing a Semantic coupled group is that an Engineer can see different aspects of the same part of the plant at the same time and the workbench is taking over the work of refocusing. In addition, the Engineer can navigate through the plant using any of the visible views, not simply the Tree View, for example, which may be the previous method for navigating an Industrial Network. Using this Mode, for example, the Engineer can navigate through technological aspects, e.g., the recipe procedures of the brewing process using a batch editor, or, for example, the data flow view (e.g. by double clicking on a function block) or the Manual view which itself can be a hypertext-document allowing navigation to linked documents which then again results in an automatic refocussing of the coupled views.

As discussed, in the present invention of Mode 1. When the user selects an object in one view, or pane, the focus of all other coupled views are refocused according to Semantics. Thus, for example, selection of a New Plant in the Tree Pane automatically causes the upper pane (U) to refocus on an electrical wiring diagram of the New Plant. Similarly, and following the Semantic of the physical plant, a layout of the specific cell/unit/reactor which is responsible to execute the currently selected recipe procedure will automatically be displayed in the other view(s).

The invention is not only advantageous for monitoring and control, it is useful for troubleshooting and debugging. For example, the present invention can relate the diagnostic view of the specific cell/unit/reactor and the training manual on the specific cell/unit/reactor is visualized automatically while navigating through the recipe procedures. In this manner, maintenance of a Plant can be easily and quickly provided.

Furthermore, the present invention is useful for providing a sense of location with the Plant and direction where to proceed. It is the case, for example, that Engineers often become encumbered in the process of navigating a Tree of a Plant. After navigating some steps through the recipe procedures, the Engineer using the present invention can switch navigation using any of the other views, such as the physical Plant layout, diagnostic view, documentation view or any other coupled view of the Plant. This eases the understanding of the actual and complex state of the plant.

It will be appreciated that Mode 1 of the present invention is advantageous particularly for monitoring a Plant, or Plants, for that matter. In Mode 1, it is possible to view in Real Time, the operation of different parts of a Plant. Switching along different views, automatically refocuses the perspective of the other panes, so that a logical and flowing navigation through the Plant is provided.

Now turning to the Second Mode of Operation shown in FIG. 4b, there is provided Temporal or Physical coupling of views. In this Mode, several views of the same kind all showing the same aspect of different parts of the plant Temporally, that is, with respect to Time. The views can be coupled Temporally at the same time or, alternatively, showing views having different times. In this latter aspect, many Temporal variations are possible and within the scope of the invention. Namely, it is possible to show different parts of the same plant at different times. Or, it is possible to show the same part of the Plant at different times. There is also the possibility to show equivalent parts of different Plants at the same time or, even, different Plants at different times.

In Mode 2, Navigation is either done in each view individually (uncoupled mode) but several focuses are shown at the same time and automatically arranged on the display e.g. in one window so that the user has optimal visibility of all parallel focuses of the same kind of view at the same time or navigation is done in one view and all other views adjust their focus automatically (coupled mode). E.g. Diagnostic views of several parts of the plants indicated at the same time and arranged in a way that they minimal overlap and are positioned (x,y) according to relationship of parts two dimensional plant layout. If focus of one view is relocated all other views are relocated automatically so that optimal plant visibility is guaranteed.

In another example, several views of physical plant layout at different points in time show different states of reconstruction process of the plant. In a coupled mode, if a point in time for one view is reset, a point in time of all other views will also be reset accordingly. This eases the understanding of complex process within the plant.

It will be appreciated that Mode 2 of the present invention is advantageous particularly for Troubleshooting a Plant, or Plants, for that matter. Over time, systems can, and do, fail. In order to predict and, therefore, avoid system failure, which is called Predictive Maintenance, the present invention provides a convenient means for reviewing aspects of the Plant in various stages of time. Thus, for example, the aging of a piece of equipment, such as a boiler, can be monitored over time and repaired or replaced before system failure.

In Mode 3 of the invention, there is provided a mixture of Modes 1 and 2. As shown in FIG. 4c, two or more of groups of views are visible at the same time. Views within a group are semantically coupled. In the other group, views are temporally or physically coupled or uncoupled. It will be appreciated that this arrangement is not merely a combination of the first two Modes, but provides additional functionality, in that the Third Mode allows maximum flexibility in comparing different parts of a plant/process/program in both a Semantic and Temporal/Physical Mode. For example, a particular recipe could be monitored in Real Time in one group, using the Semantically coupled Mode 1 while observing a particular system of the recipe process over a period of time. One will appreciate that this allows the Engineer to cross-check how the system performs within the Plant overall.

The present invention also supports navigation through defining views to be coupled. This can be done, for example, as shown in FIG. 3a by parameterization of several buttons. In addition, buttons could be provided for selecting the type of coupling-mode that can be selected. In addition user configurable or predefined "Browser/Editor Mode Buttons" which ease the selection of combinations of coupled views are provided.

Figure 5:
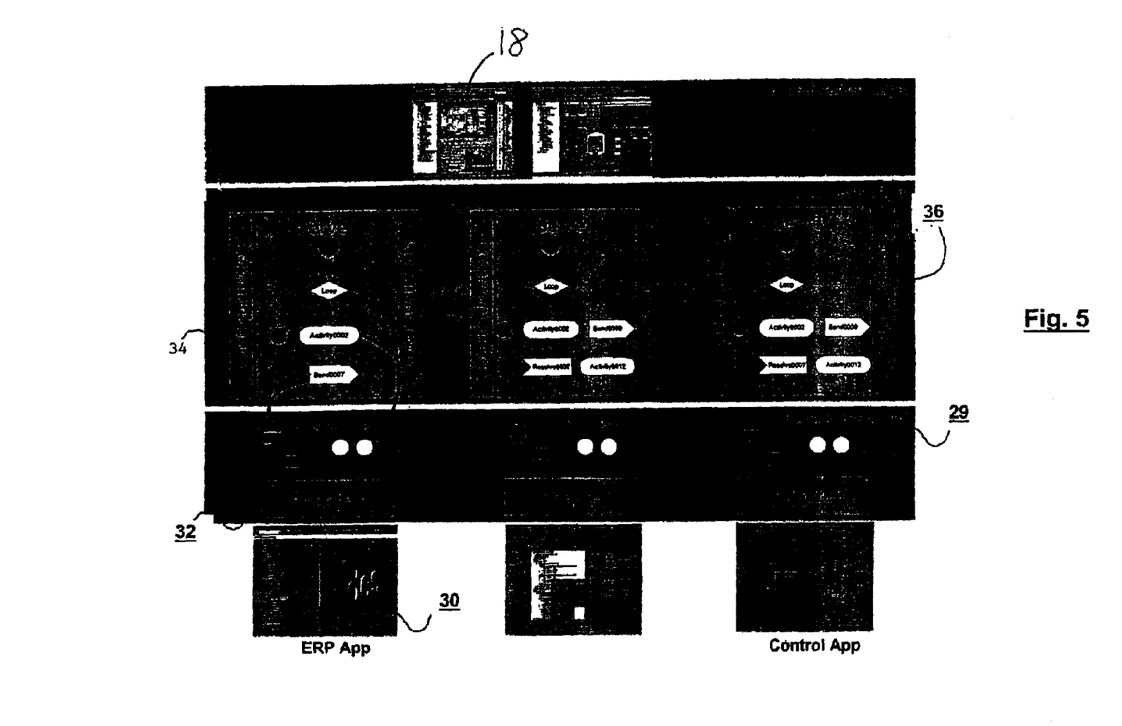
FIG. 5 illustrates the present invention in operation.

As shown in FIG. 5, the present invention provides a unique manner which facilitates the monitoring and control within a Framework. In the, particular Framework shown, the Workbench 18 operates in the presentation layer. As shown, the Workbench 18 provides a GUI wherein the several views of the Data Flows/State Machines of a Plant can be navigated easily and various related views are automatically displayed. The Data Flows/State Diagrams, so displayed by the present invention, can then be accessed and modified using the Workbench.

Before engaging in a discussion of the Industrial Framework, it shall be appreciated that, while the present invention is described in terms of an Industrial Framework, the invention encompasses and is applicable to other types of Frameworks. Thus, whilst the Framework includes other features, such as an Adaptation Layer 29 for adapting various applications 30 to the Framework, or a Business Layer 36 for publishing Methods and Data 32 and designing and modifying Data Flows/State Machines 34, the present invention is not so restricted to these features.

In more broader terms, a Framework is a software system, or sub-system that is intended to be instantiated. The instantiation of a framework involves composing and sub-classing the existing classes. A Framework for applications in a specific domain is called an application framework. It defines the architecture for a family of systems or sub-systems and provides the basic building blocks to create them and the places where adaptations for specific functionality should be made. In an object-oriented environment a framework consists of abstract and concrete classes. The Industrial Framework in the context of the present invention is but one type of Framework and may include other Frameworks, such as Telecommunications, ERP, Billing, etc.

The Industrial Framework is a complete solution for component-based production management and application integration. As shown, it is a collection of well-integrated components that are designed to integrate the systems within each factory standardize production across the whole enterprise and align manufacturing processes with supply chain activity. Within this Industrial Framework of components, there is provided a Server that provides data management and application integration. With the Industrial Framework Server, the data structures within adapted applications are graphically mapped in order to provide any information, anywhere and at any time". As will be appreciated from FIG. 2, the Industrial Framework, together with its components, provides the tools for modeling and integration of operations and data. Briefly, and as already noted, the Server forms the core of the Industrial Framework. Coupled to the Server are components which are provided with the Industrial Framework and comprise the main tools provided therewith for application by the user. Amongst these are a Production Modeler that models production, a Workbench that provides a work space for the user to access, modify and create models and an Application Builder that assists the user to create his or her own applications. In order to couple to the applications, there is provided an Adapter. As will be explained in more detail, the Adapter, and its Adapter Base, provide automatic connectivity of Applications to the Industrial Framework.

The Server forms the core of the Industrial Framework. It is the central component for the integration of applications. It is the distributed run-time environment for the transport and conversion of data and for the execution of workflows. In terms of IT tasks, the Industrial Framework Server handles all data management and manufacturing application integration. The data structures within applications adapted by the Adapter, as will be later discussed, are graphically mapped to provide complete information anywhere, at any time. The Framework Server generates data diagrams, which establish relationships between components by graphically mapping their fields, as well as activity diagrams, which synchronize the information flow.

For production and modeling, the Industrial Framework Production Modeler is responsible for the overall management of the plant. It controls and improves plant activities by coordinating and synchronizing the machines, people, and applications connected to the Industrial Framework. The Production Modeler is used for project modeling, engineering and operations and, to that end, executes production operations against an S95-compliant plant model. Encapsulated components and integration scenarios are stored in reusable libraries for rapid prototyping and the establishment of corporate manufacturing standards.

The Industrial Framework Adapter enables standardized and configurable connection of Applications to the Industrial Framework. This allows the Application's functions and data to be configured and mapped. For this purpose, the Adapter provides Data Publishing, so that any application not only has access to functions of other applications, but also allows the functions to be extended, such that the extended function can be saved and added to a library for reuse.

As will be appreciated from FIG. 2, the Industrial Framework of the present invention provides a flexible architecture which is scalable, distributed and open, providing a true n-level architecture. It will also be seen from the Figures that the Framework has multiple data transports including HTTP and MS Message Queuing, which could support remote access and control, such as through the Internet or through GSM, UMTS, for example. From the Figure, it is shown that the Framework supports both synchronous and asynchronous communication, thereby equipped to integrate any system.

In addition to the embodiments of the aspects of the present invention described above, those of skill in the art will be able to arrive at a variety of other arrangements and steps which, if not explicitly described in this document, nevertheless embody the principles of the invention and fall within the scope of the appended claims. For example, the ordering of method steps is not necessarily fixed, but may be capable of being modified without departing from the scope and spirit of the present invention.

The invention claimed is:

1. A display device for graphically displaying and coupling different views of an Industrial Plant or Industrial Network, the views being graphical representations of different domain aspects of the Industrial Plant or Industrial Network the display device comprising:
   a coupler for coupling views of the Industrial Plant or Industrial Network according to a predetermined relationship between components which are shown in the different coupled views; and
   a graphical user interface that displays the views in corresponding display areas of the graphical user interface, wherein, when an object in any of the coupled views is selected or the focus of any of the coupled views is changed or relocated, the coupler automatically refocuses the other coupled areas on related objects or on the changed or relocated focus based on the predetermined relationship for coupling the views.

2. The device of claim 1, wherein the coupler couples the views based on a predetermined relationship between the views and based on the Semantics of the Industrial Plant or views.

3. The device of claim 1, wherein the coupler couples the views based on a temporal relationship between the parts of the plant which are displayed in the views.

4. The device of claim 1, wherein the coupler couples the views based on a spatial relationship between the parts of the plant which are displayed in the views.

5. The device of claim 1, wherein the coupler couples the views based on logical or semantic relationships between the views or parts of the Industrial Plant.

6. The device of claim 1, wherein the coupler couples the views based on the predetermined relationship which is defined by semantic, temporal and spatial aspects of the systems of the Industrial Plant.

7. The device of claim 1, wherein a display device displays two or more groups of coupled views at the same time, views of either group not being coupled to views of other groups.

8. The device of claim 1, wherein the graphical user interface displays in real time the process of the Industrial Plant.

9. The device of claim 1, wherein the graphical user interface of one or more views displays means for modifying the objects displayed by the views.

10. The device of claim 1, wherein the coupled views are user interfaces for debugging of the Industrial Plant.

11. The device of claim 1, further comprising an Internet Interface for interfacing the device to Industrial Plants located remotely.

12. The device of claim 1, further comprising a toolbar in each display area to select the kind of view which is to be displayed.

13. The device of claim 1, further comprising a toolbar that selects the views that are coupled by activation of a mouse click.

14. A method for graphically displaying and coupling views of an Industrial Plant or Industrial Network, the views being graphical representations of different domain aspects of the Industrial Plant or Industrial Network, the method comprising the steps of:

coupling views of the Industrial Plant or Industrial Network according to a predetermined relationship between components which are shown in the different coupled views; and displaying the views in corresponding display areas of a graphical user interface, wherein, when an object in any of the coupled views is selected or the focus of any of the coupled views is changed or relocated, the coupling automatically refocuses the other coupled areas on related objects or on the changed or relocated focus based on the predetermined relationship for coupling the views.

15. The method of claim 14, wherein the coupling couples the views based on a predetermined relationship between the views and based on the Semantics of the Industrial Plant or views.

16. The method of claim 14, wherein coupling couples the views based on a temporal relationship between the parts of the plant which are displayed in the views.

17. The method of claim 14, wherein coupling couples the views based on a spatial relationship between the parts of the plant which are displayed in the views.

18. The method of claim 14, wherein the coupling couples the views based on a semantic relationship between the views or parts of the Industrial Plant.

19. The method of claim 14, wherein the coupling couples the views based on a logical relationship between the views or parts of the Industrial Plant.

20. The method of claim 14, wherein coupling couples the views based on the predetermined relationship which is defined by semantic, temporal and spatial aspects of the systems of the Industrial Plant.

21. The method of claim 14, further comprising the step of displaying two or more groups of coupled views at the same time, views of either group not being coupled to views of other groups.

22. The method of claim 14, further comprising the step of displaying in real time the process of the Industrial Plant.

23. The method of claim 14, further comprising the step of displaying means for modifying the objects displayed by the views.

24. The method of claim 14, wherein the coupled views are user interfaces for debugging of the Industrial Plant.

25. The method of claim 14, further comprising the step of interfacing the device to Industrial Plants located remotely.

* * * * *